(12) United States Patent
Shimizu et al.

(10) Patent No.: US 9,375,789 B2
(45) Date of Patent: Jun. 28, 2016

(54) PLASMA DEVICE FOR PRODUCTION OF METAL POWDER

(71) Applicant: Shoei Chemical Inc., Tokyo (JP)

(72) Inventors: Fumiyuki Shimizu, Tosu (JP); Masayuki Maekawa, Tosu (JP); Shusaku Kawaguchi, Tosu (JP)

(73) Assignee: SHOEI CHEMICAL INC., Tokyo (JP)

( * ) Notice: Subject to any disclaimer, the term of this patent is extended or adjusted under 35 U.S.C. 154(b) by 252 days.

(21) Appl. No.: 14/359,837

(22) PCT Filed: Nov. 8, 2012

(86) PCT No.: PCT/JP2012/078914
§ 371 (c)(1),
(2) Date: May 21, 2014

(87) PCT Pub. No.: WO2013/084650
PCT Pub. Date: Jun. 13, 2013

(65) Prior Publication Data
US 2014/0319712 A1    Oct. 30, 2014

(30) Foreign Application Priority Data

Dec. 6, 2011  (JP) ................................ 2011-266607

(51) Int. Cl.
| | |
|---|---|
| *B22F 9/12* | (2006.01) |
| *B22F 9/14* | (2006.01) |
| *H05H 1/48* | (2006.01) |
| *B01J 19/08* | (2006.01) |
| *H05B 7/18* | (2006.01) |
| *C22C 19/03* | (2006.01) |

(52) U.S. Cl.
CPC ................. *B22F 9/12* (2013.01); *B01J 19/088* (2013.01); *B22F 9/14* (2013.01); *C22C 19/03* (2013.01); *H05B 7/18* (2013.01); *H05H 1/48* (2013.01); *B01J 2219/0871* (2013.01); *B01J 2219/0879* (2013.01); *B22F 2202/13* (2013.01)

(58) Field of Classification Search
None
See application file for complete search history.

(56) References Cited

U.S. PATENT DOCUMENTS

| | | | |
|---|---|---|---|
| 6,379,419 | B1 | 4/2002 | Celik et al. |
| 2007/0221635 | A1 | 9/2007 | Boulos et al. |

FOREIGN PATENT DOCUMENTS

| | | |
|---|---|---|
| CN | 1406693 | 4/2003 |
| CN | 201340222 | 11/2009 |

(Continued)

OTHER PUBLICATIONS

Extended European Search Report; Application No. 12855937.4-1352 / 2789414; Issued Nov. 26, 2015; Applicant: Shoei Chemical Inc.; total of 9 pages.

(Continued)

*Primary Examiner* — Mary F Theisen
(74) *Attorney, Agent, or Firm* — Lucas & Mercanti, LLP

(57) ABSTRACT

A plasma device for production of metal powder includes a reaction vessel, a plasma torch, a carrier gas supply unit and a cooling tube. A metal starting material is supplied to the vessel. The torch produces plasma between the torch and the metal starting material to evaporate the metal starting material and produce a metal vapor. The supply unit supplies into the vessel a carrier gas for carrying the metal vapor. The cooling tube is provided with indirect and direct cooling sections and cools the metal vapor transferred from the vessel to produce the metal powder. The metal vapor and/or the metal powder are indirectly cooled in the indirect cooling section and directly cooled in the direct cooling section. A projection and/or a recess are disposed at least on a part of an inner wall of the indirect cooling section.

6 Claims, 7 Drawing Sheets

(56) References Cited

FOREIGN PATENT DOCUMENTS

| EP | 0282291 | 9/1988 |
| JP | 58-153533 | 9/1983 |
| JP | 63-221842 | 9/1988 |
| JP | 06-030674 | 4/1994 |
| JP | 2004-36005 A | 2/2004 |
| WO | 00/10756 A1 | 3/2000 |

OTHER PUBLICATIONS

International Preliminary Report on Patentability and Written Opinion, International Application No. PCT/JP2012/078914. Date of Issuance: Jun. 10, 2014 in Japanese and English (total of 9 pages).

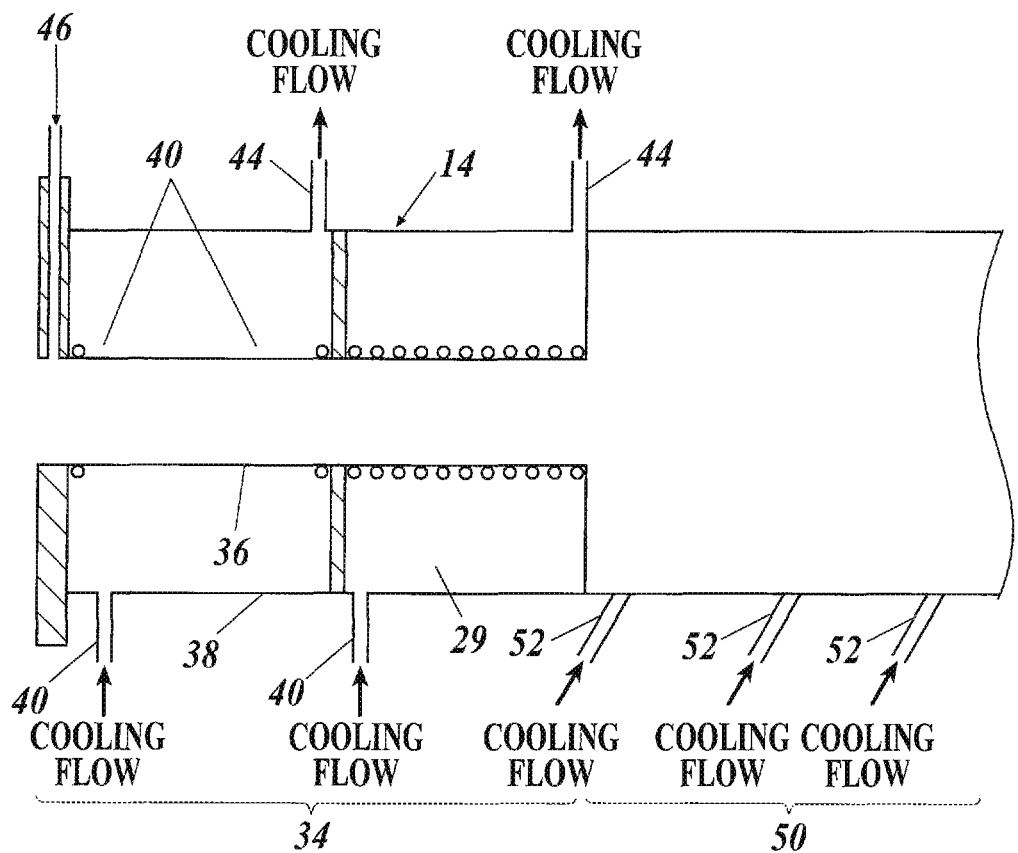

PLASMA DEVICE FOR PRODUCTION OF METAL POWDER

CROSS REFERENCE TO RELATED APPLICATION

This Application is a 371 of PCT/JP2012/078914 filed on Nov. 8, 2012 which, in turn, claimed the priority of Japanese Patent Application No. JP2011-266607 filed on Dec. 6, 2011 both applications are incorporated herein by reference.

TECHNICAL FIELD

The present invention relates to a plasma device producing metal powder, in particular, a plasma device having a cooling tube and producing metal powder by cooling in the cooling tube a metal vapor which is produced by melting and evaporating a metal starting material.

BACKGROUND ART

In manufacturing electronic components such as electronic circuits, circuit boards, resistors, capacitors and IC packages, conductive metal powder is used to form conductor films and electrodes. The characteristics and properties/conditions required for this kind of metal powder include low impurity, fine powder having an average particle diameter of about 0.01 to 10 μm, uniformity in particle shape and particle diameter, little cohesion, excellent dispersibility in paste and excellent crystallinity.

Recently, conductor films and electrodes have been thinner and fine-pitched as electronic components and circuit boards have reduced in size, so that finer spherical metal powder having high crystallinity has been demanded.

As one of methods for producing such fine metal powder, there are known plasma devices which, after melting and evaporating a metal starting material in a reaction vessel by utilizing plasma, cool and condense the metal vapor to produce a large number of metal nuclei, and grow these to obtain metal powder. (Refer to Patent Literatures 1 and 2.) These plasma devices condense the metal vapor in a gas phase, thereby capable of producing fine spherical metal particles having high crystallinity and low impurity.

Further, these plasma devices each have a long cooling tube and cool a carrier gas containing the metal vapor through a plurality of steps. For example, the plasma device described in Patent Literature 1 is provided with a first cooling unit which cools the carrier gas by directly mixing the carrier gas with a preheated hot gas and a second cooling unit which thereafter cools the carrier gas by directly mixing the carrier gas with a room-temperature cooling gas. Further, the plasma device described in Patent Literature 2 is provided with an indirect cooling section (first cooling unit) which cools the carrier gas by circulating a cooling fluid around a tubular body without making the fluid directly contact the carrier gas and a direct cooling section (second cooling unit) which thereafter cools the carrier gas by directly mixing the carrier gas with a cooling fluid.

Because the latter adopts indirect cooling in which radiative cooling is dominant, as compared with another plasma device in which conductive or convective cooling is dominant, from the metal vapor, the metal nuclei (hereinafter simply referred to as "nuclei") are uniformly produced, grown and crystallized, and the metal powder with a particle diameter and a particle size distribution controlled can be obtained, in particular.

RELATED ART LITERATURES

Patent Literatures

Patent Literature 1: US 2007/0221635 A1
Patent Literature 2: U.S. Pat. No. 6,379,419 B1

SUMMARY OF THE INVENTION

Problems to be Solved by the Invention

FIG. 7 shows the configuration of the cooling tube described in Patent Literature 2. As shown in FIG. 7, a cooling tube 14 is provided with an indirect cooling section 34 and a direct cooling section 50, and the indirect cooling section 34 is composed of a duplex tube of an inner tube 36 and an outer tube 38. By circulating a cooling fluid in a space between the outer wall of the inner tube 36 and the inner wall of the outer tube 38, indirect cooling is performed on the metal vapor from a reaction vessel and on the metal powder produced by condensing the metal vapor. In the direct cooling section 50 which is continuous with this, direct cooling is performed by mixing the carrier gas with a cooling fluid. The direct cooling section 50 adopts a cooling tube having the inner diameter larger than that of the indirect cooling section 34, which rapidly expands the carrier gas having passed through the indirect cooling section 34 and increases cooling efficiency.

By the way, in the indirect cooling section 34, radiative cooling is performed on the metal vapor which is in the carrier gas and is transferred into the cooling tube while keeping high temperature, and therefore uniform and stable production, growth and crystallization of the metal nuclei progress. However, when the metal powder is produced by the device described in Patent Literature 2, according to studies of the present inventors, although the particle size distribution of the metal powder obtained thereby is better than that by conventional plasma devices, there is a limitation when an attempt is made to obtain a sharper particle size distribution.

The present inventors have advanced the studies for its cause and have found that there is difference in flow rate and temperature of the carrier gas, concentration of the metal vapor, and the like between a region near the inner wall of the cooling tube and a region near the center (axis) thereof in the indirect cooling section. Hence, it is not certain but possible that because of the difference, timing at which the nuclei are produced differs between the region near the inner wall of the cooling tube and the region near the center thereof, and the nuclei precipitated at an early timing become large by grain growth, coalescence in particular, whereas the nuclei precipitated late reach the direct cooling section before coalescence and are rapidly cooled, which affects the particle size distribution. In addition, the smaller the inner diameter of the cooling tube is, the more striking the above-described difference is.

Then, the present inventors have expanded the inner diameter of the inner tube 36 in the indirect cooling section 34 shown in FIG. 7 to about the same as the direct cooling section 50. As a result, production efficiency has greatly decreased. This is considered because the concentration (density) of the metal vapor contained in the carrier gas in the indirect cooling section 34 has decreased, the nuclei have not been produced enough in the indirect cooling section 34. It has also been found that another problem arises that the nuclei having just started to be precipitated easily adhere to the inner wall of the inner tube 36 because the flow rate of the carrier gas becomes slow.

An object of the present invention is providing a plasma device for production of metal powder, the plasma device which solves these problems, can obtain metal powder having a narrow particle size distribution and has higher production efficiency.

Means for Solving the Problems

According to the invention of item 1, there is provided a plasma device for production of metal powder, including: a reaction vessel to which a metal starting material is supplied; a plasma torch which produces plasma between the plasma torch and the metal starting material in the reaction vessel so as to evaporate the metal starting material and produce a metal vapor; a carrier gas supply unit which supplies into the reaction vessel a carrier gas for carrying the metal vapor; and a cooling tube which cools the metal vapor transferred from the reaction vessel with the carrier gas so as to produce the metal powder, wherein the cooling tube is provided with: an indirect cooling section where the metal vapor transferred from the reaction vessel with the carrier gas and/or the metal powder are indirectly cooled; and a direct cooling section where the metal vapor and/or the metal powder are directly cooled, the direct cooling section being continuous with the indirect cooling section, and at least on a part of an inner wall of the indirect cooling section, a projection and/or a recess are disposed.

According to the invention of item 2, provided is the plasma device for production of metal powder according to item 1, wherein the projection and/or the recess are disposed on the inner wall on an upstream side from a position where a metal nucleus starts to be precipitated in the indirect cooling section.

According to the invention of item 3, provided is the plasma device for production of metal powder according to item 1 or 2, wherein a plurality of the projections and/or a plurality of the recesses are disposed on the inner wall in the indirect cooling section.

According to the invention of claim 4, provided is the plasma device for production of metal powder according to item 3, wherein the plurality of the projections and/or the plurality of the recesses are disposed on the inner wall in the indirect cooling section spirally in a longitudinal direction of the cooling tube.

According to the invention of item 5, provided is the plasma device for production of metal powder according to any one of items 1 to 4, wherein the indirect cooling section is a section where the metal vapor and/or the metal powder are cooled by cooling a periphery of the cooling tube with a cooling fluid without making the cooling fluid directly contact the metal vapor and/or the metal powder, and the direct cooling section is a section where the metal vapor and/or the metal powder are cooled by making a cooling fluid directly contact the metal vapor and/or the metal powder.

Advantageous Effects of the Invention

According to the plasma device for production of metal powder of the present invention, the flow rate and temperature of the carrier gas, the concentration of the metal vapor, and the like in the indirect cooling section can be made uniform, and therefore metal powder having a narrow particle size distribution can be obtained without decreasing the production efficiency.

In particular, by disposing the projection(s) and/or the recess(es) on the upstream side from the region where the metal nuclei start to be precipitated in the cooling tube in the indirect cooling section, the present invention can progress production, growth and crystallization of the nuclei in a gentle, more stable and uniform atmosphere without diminishing the merits of indirect cooling.

BRIEF DESCRIPTION OF DRAWINGS

FIG. 7 shows a cooling tube of a conventional example (Patent Literature 2).

EMBODIMENT FOR CARRYING OUT THE INVENTION

In the following, the present invention is described on the basis of a specific embodiment. However, the present invention is not limited thereto.

Figure 1:
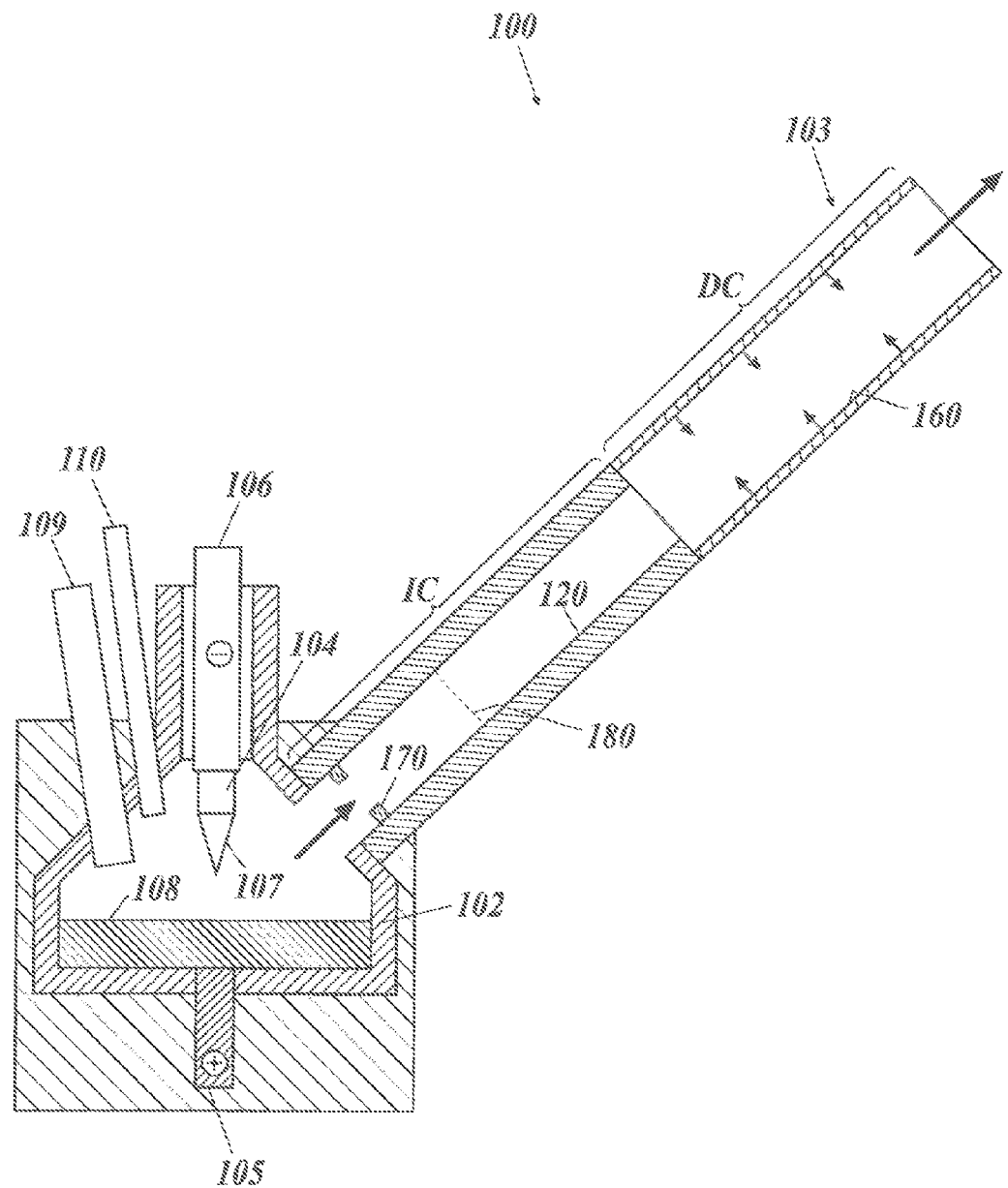
FIG. 1 shows the overall configuration of a plasma device for production of metal powder of the present invention.

FIG. 1 shows an example of a plasma device 100 for production of metal powder (hereinafter simply referred to as a plasma device) which is made by applying the present invention to a transferred arc plasma device similar to that of Patent Literature 2 and which produces metal particles by melting and evaporating a metal starting material in a reaction vessel 102 and cooling and condensing the produced metal vapor in a cooling tube 103.

The metal starting material of the present invention is not particularly limited as long as it is a conductive substance containing a metallic element(s) for the target metal powder, and therefore an alloy, a complex, a mixture, a compound or the like containing two or more kinds of metallic elements can be used therefor, other than pure metal. Examples of the metallic elements include silver, gold, cadmium, cobalt, copper, iron, nickel, palladium, platinum, rhodium, ruthenium, tantalum, titanium, tungsten, zirconium, molybdenum and niobium. Although not particularly limited, it is preferable to use, as the metal starting material, a granular or block metal material or alloy material having a size of about several mm to several-ten mm in terms of ease of treatment.

In the following, for easy understanding, the embodiment is described with nickel powder produced as the metal powder and metal nickel used as the metal starting material, as an example. However, the present invention is not limited thereto.

Before the device starts operating, a predetermined amount of metal nickel is prepared in the reaction vessel 102, and after the device starts operating, metal nickel is timely supplied into the reaction vessel 102 from a feeding port 109 according to the amount of metal nickel lost from the reaction vessel 102 as the metal vapor. Hence, the plasma device of the present invention can continuously produce the metal powder for many hours.

At the upper part of the reaction vessel 102, a plasma torch 104 is placed, and a plasma producing gas is supplied to the plasma torch 104 through a not-shown supply tube. The plasma torch 104 produces plasma 107 with a cathode 106 as the negative pole and a not-shown anode provided inside the plasma torch 104 as the positive pole and thereafter transfers the positive pole to an anode 105, thereby producing the plasma 107 between the cathode 106 and the anode 105, and melts at least a part of metal nickel in the reaction vessel 102 by heat of the plasma 107, thereby forming molten metal 108 of nickel. In addition, the plasma torch 104 evaporates a part of the molten metal 108 by heat of the plasma 107, thereby producing nickel vapor (equivalent to the metal vapor of the present invention).

A carrier gas supply unit 110 supplies into the reaction vessel 102 a carrier gas for carrying nickel vapor. When the metal powder to be produced is a precious metal, there is no particular limitation on the carrier gas, and an oxidizing gas such as air, oxygen or steam; an inert gas such as nitrogen or argon; a mixed gas of these; or the like can be used, whereas when a base metal such as nickel or copper which is easily oxidized is to be produced, it is preferable to use an inert gas. In the following, nitrogen gas is used as the carrier gas unless otherwise specified.

With the carrier gas, a reducing gas such as a gas of hydrogen, carbon monoxide, methane, ammonia or the like; or an organic compound such as any of alcohols or carboxylic acids may be mixed as needed. Further, in order to improve/adjust the properties/conditions or characteristics of the metal powder, an element such as oxygen, phosphorus or sulfur may be contained therein. The plasma producing gas, which is used for producing the plasma, also functions as a part of the carrier gas.

The carrier gas containing nickel vapor, which is produced in the reaction vessel 102, is transferred to the cooling tube 103.

The cooling tube 103 is provided with an indirect cooling section IC where nickel vapor and/or nickel powder which are contained in the carrier gas are indirectly cooled and a direct cooling section DC where nickel vapor and/or nickel powder which are contained in the carrier gas are directly cooled.

In the indirect cooling section IC, the periphery of the cooling tube 103 (inner tube 120) is cooled or heated by using, for example, a cooling fluid or an external heater, and the temperature of the indirect cooling section IC is controlled, whereby cooling is performed. As the cooling fluid, the above-described carrier gas or another gas can be used. Also, a liquid such as water, hot water, methanol, ethanol, a mixture of any of these, or the like can be used. However, in terms of the cooling efficiency and costs, it is preferable to use water or hot water as the cooling fluid and circulate this around the cooling tube 103 so as to cool the cooling tube 103.

The indirect cooling section IC may be, as described in Japanese Patent Application No. 2011-263165, composed of two or more sections having different inner diameters. In particular, it is preferable that the indirect cooling section IC be provided with a first indirect cooling section to which the carrier gas containing nickel vapor is transferred from the reaction vessel and a second indirect cooling section placed between the first indirect cooling section and the direct cooling section, and the inner diameter of the first indirect cooling section be smaller than the inner diameter of the second indirect cooling section. This kind of device precipitates the nuclei enough by performing indirect cooling in the first indirect cooling section in a state in which the concentration of the metal vapor is high, continues indirect cooling in the second indirect cooling section in a state in which the concentration of the metal vapor is decreased, and then performs direct cooling, and therefore the metal powder can be grown and crystallized in a more uniform atmosphere, and the metal powder having a narrower particle size distribution can be obtained.

In the indirect cooling section IC, nickel vapor which is in the carrier gas and is transferred into the cooling tube 103 while keeping high temperature is relatively gradually cooled by radiation, and production, growth and crystallization of the nuclei progress in an atmosphere in which the temperature is controlled to be stable and uniform, whereby nickel powder composed of particles having uniform diameters is produced in the carrier gas.

In the direct cooling section DC, a cooling fluid supplied from a not-shown cooling fluid supply unit is spouted to or mixed with nickel vapor and/or nickel powder which are transferred from the indirect cooling section IC, whereby direct cooling is performed. The cooling fluid used in the direct cooling section DC maybe the same as or different from the cooling fluid used in the indirect cooling section IC. However, in terms of ease of treatment and costs, it is preferable to use a gas (nitrogen gas in the embodiment) which is the same as the carrier gas. When a gas is used, as with the above-described carrier gas, a reducing gas, an organic compound or an element such as oxygen, phosphorus or sulfur may be mixed with the gas as needed to use. When the cooling fluid contains a liquid, the cooling fluid in which the liquid is sprayed is introduced into the cooling tube 103 (inner tube 160).

In the drawings for this description, the specific cooling mechanisms of the indirect cooling section IC and the direct cooling section DC are omitted. Unless hindering the effects of the present invention, known mechanisms can be used therefor. For example, the ones described in Patent Literature 2 can also be appropriately used.

In the carrier gas in the indirect cooling section IC, nickel vapor and nickel powder coexist. However, a proportion of nickel vapor on the downstream side is lower than that of nickel vapor on the upstream side. Further, depending on devices, nickel vapor and nickel powder may coexist in the carrier gas in the direct cooling section DC too. However, as described above, it is preferable that production, growth and crystallization of the nuclei progress and be completed in the indirect cooling section IC, and therefore it is preferable that no nickel vapor be contained in the carrier gas in the direct cooling section DC.

The carrier gas containing the metal powder is carried from the cooling tube 103 to further downstream, and the metal powder and the carrier gas are separated from each other in a not-shown collector, and the metal powder is collected therein. The carrier gas separated in the collector may be reused in the carrier gas supply unit 110.

When introduced to the indirect cooling section IC from the reaction vessel 102, the metal vapor in the carrier gas has a high concentration and a temperature of several-thousand K (for example, 3000K). However, by indirect cooling (radiative cooling), the temperature decreases to near the boiling point of the metal, and many nuclei start to be precipitated at a certain position in the indirect cooling section IC at approximately the same time. The position where the nuclei start to be precipitated changes according to the type of the target metal, the concentration of the metal vapor, the flow rate of the carrier gas, the temperature of the metal vapor or the carrier gas, the temperature distribution in the tube, and the like and therefore does not indicate a particular position. However, in the embodiment, for easy understanding, assume that the nuclei start to be precipitated at a position indicated by a virtual plane 180 in the drawings.

Figure 2A:
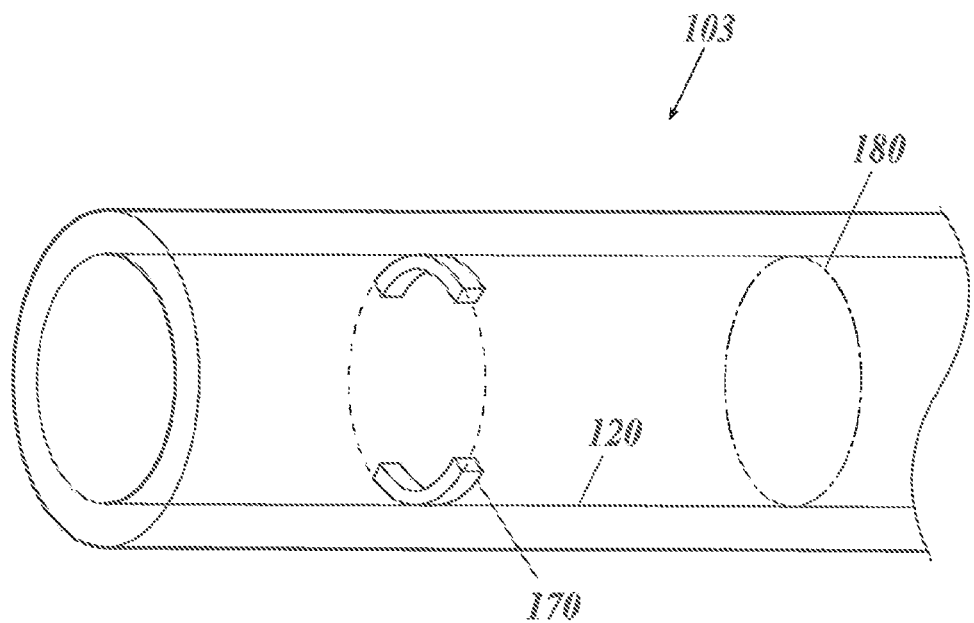
FIG. 2A shows an example of a cooling tube of the present invention.

In an example shown in FIG. 2A, the cooling tube 103 has projections 170 arranged at two points on the inner wall of the inner tube 120 in the indirect cooling section IC, the two points facing each other on the upstream side from the virtual plane 180. With the existence of the projections 170, in the cooling tube 103, the flow of the mixed gas composed of the carrier gas and the metal vapor is disturbed, and whereby the mixed gas is stirred, which can prevent non-uniformity in temperature and flow rate of the carrier gas and concentration of the metal vapor between the region near the inner wall of the cooling tube 103 and the region near the center thereof and therefore can make the timings at which the nuclei are precipitated uniform.

In the present invention, the size, shape, number, arrangement and the like of the projections are not particularly limited as long as the projections properly stir the mixed gas composed of the carrier gas and the metal vapor and therefore the non-uniformity between the region near the inner wall of the cooling tube and the region near the center thereof hardly occurs. For example, the size of the projections is properly decided according to the type of the target metal, the concentration of the metal vapor, the flow rate of the carrier gas, the temperature of the metal vapor or the carrier gas, the temperature distribution in the tube, and the like. If the size is too large, non-uniformity in metal concentration (concentration including the metal vapor and the nuclei) in the cooling tube increases, and this negatively affects the particle size distribution, whereas if the size is too small, the effects of the present invention cannot be obtained. The proper size, shape, number, arrangement and the like of the projections can be appropriately designed by performing simulations in advance with the above-described factors taken into consideration.

Figure 3A:
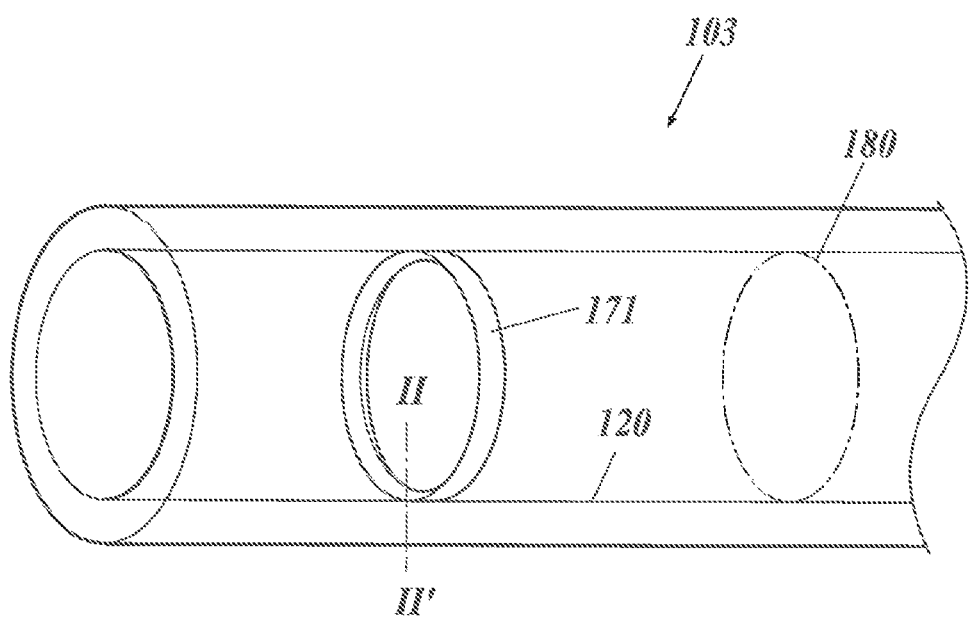
FIG. 3A shows another example of the cooling tube of the present invention.
Figure 3B:
FIG. 3B shows a projection shown in FIG. 3A.

As shown in FIG. 3A, a projection 171 may be ring-shaped. The projection 171, which is shown in FIG. 3A as an example, enables more effective stirring by having a wedge-shaped section having inclination on the upstream side as shown in FIG. 3B.

Figure 4:
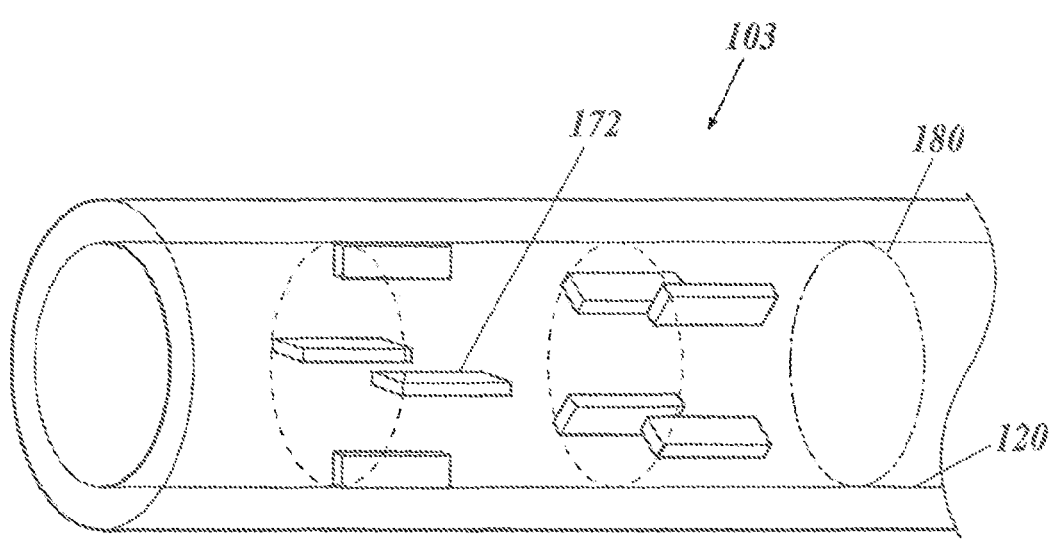
FIG. 4 shows another example of the cooling tube of the present invention.

As shown in FIG. 4, projections 172 maybe arranged along the longitudinal direction (axial direction) of the cooling tube 103. In this example, four projections 172 are arranged at each of the upstream side and the downstream side in parallel. The sections of the projections 172 are rectangular.

Figure 5A:
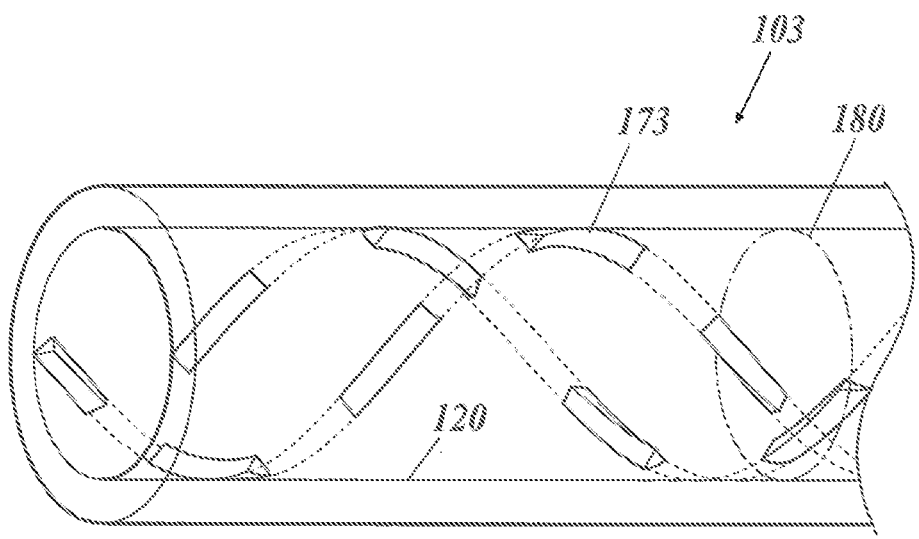
FIG. 5A shows another example of the cooling tube of the present invention.
Figure 5B:
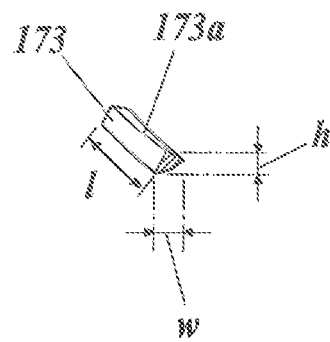
FIG. 5B shows a projection shown in FIG. 5A.

As shown in FIG. 5A, projections 173 may be arranged spirally in the longitudinal direction of the cooling tube 103 in parallel. In this example, over the entire area of the indirect cooling section IC, a plurality of projections 173 each having an approximately triangular section shown in FIG. 5B are arranged spirally, thereby producing a swirl flow by which the carrier gas moves toward the downstream side while rotating in the cooling tube 103. The projections 173 are arranged in such away that pointed parts 173a face the center of the inner tube 120. There are two spirals in FIG. 5A, but may be one spiral or three or more spirals. Further, the projections 173 are arranged at intervals in FIG. 5A, but may be in the shape of one belt.

In the present invention, as long as the mixed gas composed of the carrier gas and the metal vapor is properly stirred over the region near the inner wall of the cooling tube and the region near the center thereof, a recess(es) may be arranged on the inner wall thereof instead of the projection(s), or both the projection(s) and the recess(es) may be formed.

Figure 6:
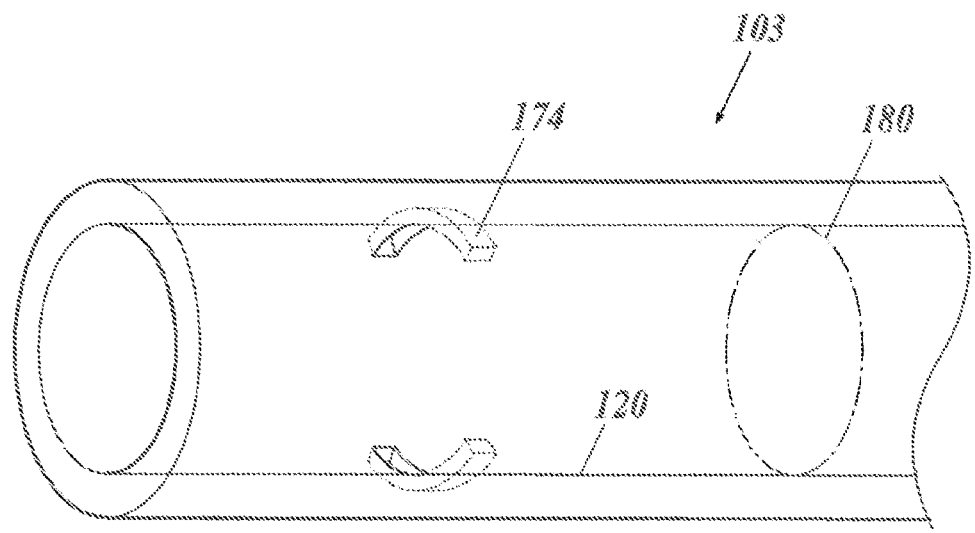
FIG. 6 shows another example of the cooling tube of the present invention.

In FIG. 6 which shows an example of arrangement of recesses, recesses 174 are formed at two points on the inner wall of the inner tube 120 in the indirect cooling section IC, the two points facing each other on the upstream side from the virtual plane 180. The sections of the recesses 174 are rectangular. The recesses 174 can prevent non-uniformity in temperature and flow rate of the carrier gas and concentration of the metal vapor between the region near the inner wall of the cooling tube 103 and the region near the center thereof and therefore can make the timings at which the nuclei are precipitated uniform.

The projection(s) and/or the recess(es) need to be arranged at least on the upstream side from the position (virtual plane 180) where the metal nuclei start to be precipitated in the indirect cooling section IC, and therefore arrangement of them which lie in a row on the downstream side from the virtual plane 180 too as shown in FIG. 5A is not excluded.

It is preferable that the height of the projections and/or the depth of the recesses be within a range of 1 to 100 mm, for example.

EXAMPLES

First Example

Figure 2B:
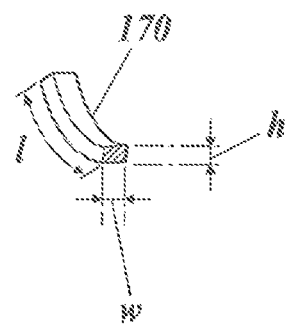
FIG. 2B shows a projection shown in FIG. 2A.

Nickel powder was produced by the plasma device 100 shown in FIG. 1 having the cooling tube 103 with the projections 170 shown in FIGS. 2A and 2B arranged. The cooling tube 103 was composed of the inner tube 120 (indirect cooling section IC) having an inner diameter of 8 cm and a length of 115 cm and the inner tube 160 (direct cooling section DC) having an inner diameter of 18 cm and a length of 60 cm combined. On the inner wall of the inner tube 120 in the indirect cooling section IC, two projections 170 each having a height (h) of 1 cm, a width (w) of 1 cm and a length (l) of 5 cm were arranged at a position of 20 cm from the upstream end of the inner tube 120.

The carrier gas passing through the cooling tube 103 was 300 L per minute, and the metal concentration was controlled to be within a range of 2.1 to 14.5 g/m$^3$.

With respect to the obtained nickel powder, from cumulative percentage by weight of 10% value, 50% value and 90% value (hereinafter "D10", "D50" and "D90", respectively) of the particle size distribution measured by using a laser particle size distribution measuring device, SD value expressed by SD=(D90−D10)/(D50) was obtained as an indicator of the particle size distribution.

The nickel powder obtained in First Example had D50=0.40 μm and SD=1.28, namely, had a narrow particle size distribution.

First Comparative Example

Nickel powder was produced by the same device under the same condition as those of First Example except that no projections 170 were arranged.

The nickel powder obtained in First Comparative Example had D50=0.47 μm and SD=1.36.

Second Example

Nickel powder was produced in the same manner as that of First Example except that the cooling tube 103 with the projections 173 shown in FIGS. 5A and 5B arranged was used. As the projections 173, there were prepared a plurality of blocks each having a length (l) of 3 cm and having an approximately isosceles triangular section having a base (w) of 1 cm and a height (h) of 1 cm. On the inner wall of the inner tube 120, the projections 173 were arranged over the entire area of the indirect cooling section IC as two spirals in such a way that the longitudinal direction of the projections 173 was at an angle of 45° to the longitudinal direction (axial direction) of the cooling tube 103.

The nickel powder obtained in Second Example had D50=0.44 μm and SD=1.10, namely, had a narrow particle size distribution.

As the above results show, the nickel powder obtained in each of First Example and Second Example had a narrower particle size distribution than that of the nickel powder obtained in First Comparative Example.

In the present invention, the inner diameters and lengths of the inner tubes in the indirect cooling section and the direct cooling section should be appropriately set according to the type of the target metal, the concentration of the metal vapor, the flow rate of the carrier gas, the temperature of the metal vapor or the carrier gas, the temperature distribution in the tubes, and the like and are not limited to the above examples.

INDUSTRIAL APPLICABILITY

The present invention is applicable to plasma devices which produce metal powder used in various electronic components, electronic devices and the like.

EXPLANATION OF REFERENCE NUMERALS

100 Plasma device for production of metal powder
102 Reaction vessel
103 Cooling tube
104 Plasma torch
107 Plasma
110 Carrier gas supply unit
170, 171, 172, 173 Projection
174 Recess
IC Indirect cooling section
DC Direct cooling section

The invention claimed is:

1. A plasma device for production of metal powder, comprising:
    a reaction vessel to which a metal starting material is supplied;
    a plasma torch which produces plasma between the plasma torch and the metal starting material in the reaction vessel so as to evaporate the metal starting material and produce a metal vapor;
    a carrier gas supply unit which supplies into the reaction vessel a carrier gas for carrying the metal vapor; and
    a cooling tube which cools the metal vapor transferred from the reaction vessel with the carrier gas so as to produce the metal powder, wherein
    the cooling tube is provided with: an indirect cooling section where the metal vapor transferred from the reaction vessel with the carrier gas and/or the metal powder are indirectly cooled; and a direct cooling section where the metal vapor and/or the metal powder are directly cooled, the direct cooling section being continuous with the indirect cooling section, and
    at least on a part of an inner wall of the indirect cooling section, a projection and/or a recess are disposed.

2. The plasma device for production of metal powder according to claim 1, wherein the projection and/or the recess are disposed on the inner wall on an upstream side from a position where a metal nucleus starts to be precipitated in the indirect cooling section.

3. The plasma device for production of metal powder according to claim 1, wherein a plurality of the projections and/or a plurality of the recesses are disposed on the inner wall in the indirect cooling section.

4. The plasma device for production of metal powder according to claim 3, wherein the plurality of the projections and/or the plurality of the recesses are disposed on the inner wall in the indirect cooling section spirally in a longitudinal direction of the cooling tube.

5. The plasma device for production of metal powder according to claim 1, wherein
    the indirect cooling section is a section where the metal vapor and/or the metal powder are cooled by cooling a periphery of the cooling tube with a cooling fluid without making the cooling fluid directly contact the metal vapor and/or the metal powder, and
    the direct cooling section is a section where the metal vapor and/or the metal powder are cooled by making a cooling fluid directly contact the metal vapor and/or the metal powder.

6. A method for producing metal powder, comprising the steps of:
    supplying the metal starting material to the reaction vessel of the plasma device for production of metal powder according to claim 1;
    producing the plasma between the plasma torch and the metal starting material in the reaction vessel so as to evaporate the metal starting material and produce the metal vapor; and
    indirectly cooling the metal vapor transferred from the reaction vessel with the carrier gas and/or the metal powder in the indirect cooling section of the cooling tube and thereafter directly cooling the metal vapor and/or the metal powder in the direct cooling section of the cooling tube, wherein
    in the step of cooling, a mixed gas composed of the carrier gas and the metal vapor is stirred with the existence of the projection and/or the recess, which are disposed at least on the part of the inner wall of the indirect cooling section.

* * * * *